(12) United States Patent
Yumita

(10) Patent No.: US 7,586,816 B2
(45) Date of Patent: Sep. 8, 2009

(54) PLAYBACK APPARATUS AND LAYER JUMP METHOD

(75) Inventor: Motoyasu Yumita, Kanagawa (JP)

(73) Assignee: Sony Corporation (JP)

(*) Notice: Subject to any disclaimer, the term of this patent is extended or adjusted under 35 U.S.C. 154(b) by 771 days.

(21) Appl. No.: 11/365,591

(22) Filed: Mar. 2, 2006

(65) Prior Publication Data

US 2006/0198259 A1    Sep. 7, 2006

(30) Foreign Application Priority Data

Mar. 2, 2005   (JP) .............................. 2005-057102
Mar. 23, 2005  (JP) .............................. 2005-083484

(51) Int. Cl.
   *G11B 7/00*   (2006.01)
(52) U.S. Cl. .................. 369/44.27; 369/44.26
(58) Field of Classification Search ........... None
   See application file for complete search history.

(56) References Cited

U.S. PATENT DOCUMENTS

| | | | | |
|---|---|---|---|---|
| 5,287,339 A | * | 2/1994 | Watanabe | 369/44.25 |
| 5,920,528 A | * | 7/1999 | Ohshima et al. | 369/44.29 |
| 6,108,291 A | * | 8/2000 | Ono et al. | 369/47.11 |
| 6,744,709 B2 | * | 6/2004 | Kobayashi | 369/44.25 |

FOREIGN PATENT DOCUMENTS

| | | |
|---|---|---|
| JP | 07-093764 | 4/1995 |
| JP | 11-098759 | 4/1999 |
| JP | 11-191222 | 7/1999 |
| JP | 2001-319344 | 11/2001 |
| JP | 2002-269770 | 9/2002 |
| JP | 2002-279654 | 9/2002 |

* cited by examiner

*Primary Examiner*—Wayne R Young
*Assistant Examiner*—Adam R Giesy
(74) *Attorney, Agent, or Firm*—Rader Fishman & Grauer PLLC; Christopher M. Tobin

(57) ABSTRACT

A playback apparatus that plays back a recording medium having recording layers includes an optical head irradiating the recording layers with laser light using an objective lens and reading information recorded in the recording layers; an actuator holding the objective lens; focus servo means for driving the actuator to execute focus servo; layer movement driving means for driving the actuator to perform movement of the objective lens in an interlayer direction; tracking servo means for driving the actuator to execute tracking servo; center-point servo means for driving the actuator to execute center-point servo for setting the objective lens to a center point position; and layer jump sequence control means for performing a series of layer jump operations and causing the center-point servo means to execute the center-point servo in a predetermined time within a period during which the series of layer jump operations is performed.

9 Claims, 12 Drawing Sheets

LASER INCIDENT DIRECTION

FOCUS SERVO IS TURNED ON

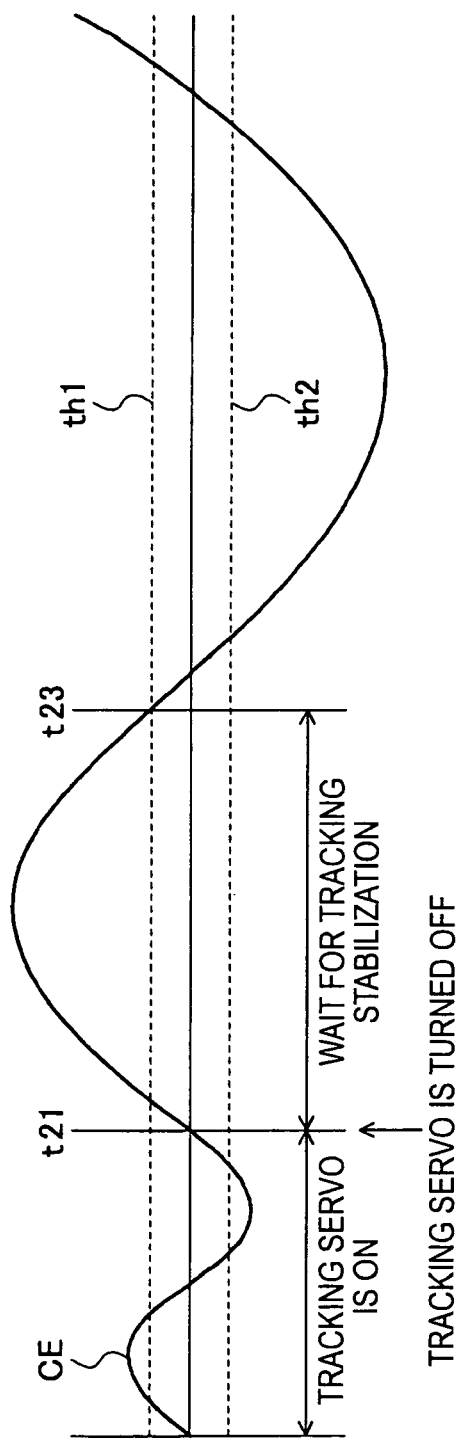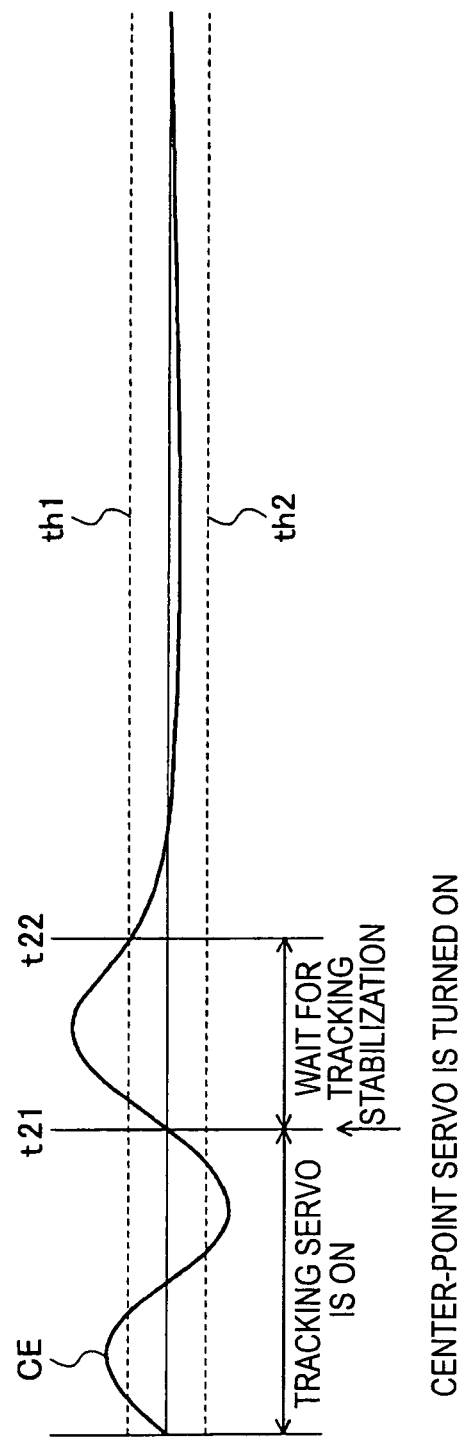

PLAYBACK APPARATUS AND LAYER JUMP METHOD

CROSS REFERENCES TO RELATED APPLICATIONS

The present invention contains subject matter related to Japanese Patent Application JP 2005-057102 filed in the Japanese Patent Office on Mar. 2, 2005 and Japanese Patent Application JP 2005-083484 filed in the Japanese Patent Office on Mar. 23, 2005, the entire contents of which are incorporated herein by reference.

BACKGROUND OF THE INVENTION

1. Field of the Invention

The present invention relates to playback apparatuses and layer jump methods for recording media, such as optical discs, having a plurality of recording layers.

2. Description of the Related Art

Optical discs are widely known as optical recording media onto or from which information can be optically recorded or played back. For example, discs based on various standards, such as compact disc (CD), digital versatile disc (DVD), and Blu-Ray disc (Trade Mark), have been developed.

Information is recorded or played back by irradiating an optical disc with tiny light beams collected via a lens using laser light from a semiconductor laser or the like as a light source. As is publicly known, in order to keep laser light focused on a recording layer of an optical disc, a focus servo operation is executed. The focus servo operation is executed by moving, in accordance with a focus error signal, an objective lens held by a biaxial mechanism (biaxial actuator) within an optical head toward and away from the disc, that is, in a focus direction.

In recent years, discs having a plurality of recording layers, such as multilayer discs having two or more layers, have been developed as optical discs. For such multilayer discs, in order to move from a recording/playback operation for a recording layer to a recoding/playback operation for another recording layer, layer jump is performed. For example, in order to move from a state in which focus servo is turned on for a first layer to a state in which focus servo is turned on for a second layer, layer jump movement of an objective lens is performed.

"Layer jump" is a moving operation between recording layers for a position on which laser is focused on, and is also referred to as "focus jump".

Technologies relating to an operation called "focus jump" or "layer jump" are disclosed in Japanese Unexamined Patent Application Publication Nos. 2002-269770, 2001-319344, 2002-279654, and 11-191222.

The biaxial actuator holding the objective lens supports the objective lens such that the objective lens is capable of moving in a radial direction of the disc. When the objective lens is controlled in the radial direction of the disc (that is, in the tracking direction), a tracking servo operation is executed such that a recording track on the disc is traced with laser light.

In addition, a technology called a center-point servo operation in which the biaxial actuator keeps the objective lens at a center point position in the radial direction of the disc is known. For example, in order to move the optical head in the radial direction of the disc, by executing the center-point servo operation, the objective lens is maintained at a center point position, that is, at a center position of a range in which the objective lens can oscillate in the radial direction of the disc.

Technologies relating to the center-point servo operation are described in Japanese Unexamined Patent Application Publication Nos. 11-98759 and 7-93764.

SUMMARY OF THE INVENTION

A reduction in the time necessary for layer jump processing is required, and the stability in the layer jump processing is also required.

Normally, in order to perform layer jump from a recording layer to another recording layer, in a state in which tracking servo and focus servo are turned off, an objective lens is driven in an interlayer direction, that is, in a focus direction, and moved to a position near an in-focus position for the target recording layer. When the objective lens is moved to the position near the in-focus position, the focus servo is turned on to achieve an in-focus state, and the tracking servo is also turned on. Accordingly, the layer jump processing is completed, and recording/playback to/from the jump destination recording layer can be performed.

In known technologies, however, since no control is performed on a tracking coil side of a biaxial actuator during layer jump processing, for example, for a disc having a large eccentricity in a recording layer before jump, an objective lens greatly oscillates in a tracking direction when tracking servo is turned off before the layer jump. Thus, a harmful effect of cross action is exerted in a focus direction, and this destabilizes the layer jump processing. In addition, the performance of a tracking servo pull-in operation for a recording layer to which the jump is performed is deteriorated.

In addition, in a case where eccentricity in the recording layer to which the jump is performed is large, an increase in the speed due to oscillation of an actuator in the tracking direction is combined with an increase in the speed due to the eccentricity. Thus, in this case, the stability in the tracking servo pull-in operation is significantly reduced.

In other words, although the focus servo and the tracking servo are turned on before the layer jump processing starts, since a normal tracking error signal is not acquired during the layer jump processing, the tracking servo (and the slide servo) is (are) turned off immediately before jump. In this case, since the tracking servo is suddenly turned off in a state in which the objective lens held by the biaxial actuator follows eccentricity of a disc, if the eccentricity of the disc is very large or if eccentricity due to chucking is large, the tracking servo control is cancelled in a state in which the objective lens is moving in the tracking direction at very high speed. As a result, the objective lens oscillates at a resonance frequency f0 of the biaxial actuator for a while.

Since the layer jump processing is performed while the objective lens is oscillating, the tracking servo pull-in operation immediately after the jump operation is destabilized.

In order to solve the above-mentioned problems, a procedure for entering the tracking servo pull-in operation after waiting until the oscillation of the objective lens in the tracking direction stabilizes to some extent after jump can be adopted. However, since there is a need to wait for stabilization in the tracking direction, the layer jump processing time is inevitably increased.

In other words, since the tracking servo pull-in operation is performed after waiting until stabilization of the oscillation level of the biaxial actuator in the tracking direction is achieved, the pull-in operation itself is stabilized. However, when eccentricity is large, as described above, a time for waiting until stabilization is achieved is significantly increased.

It is desirable to achieve the stability in layer jump processing and to reduce a time necessary for the layer jump processing.

A playback apparatus according to an embodiment of the present invention that plays back a recording medium having a plurality of recording layers includes an optical head that irradiates the plurality of recording layers with laser light using an objective lens as an output terminal, that detects reflection information on the laser light, and that reads information recorded in the plurality of recording layers; an actuator that holds the objective lens such that the objective lens is capable of moving in a focus direction and a tracking direction; focus servo means for driving the actuator in accordance with a focus error signal acquired from the reflection information read by the optical head to execute focus servo; layer movement driving means for generating a layer jump driving signal used for moving a position of the objective lens from an in-focus position for a recording layer to an in-focus position for another recording layer to drive the actuator to perform movement of the objective lens in an interlayer direction; tracking servo means for driving the actuator in accordance with a tracking error signal acquired from the reflection information read by the optical head to execute tracking servo; center-point servo means for driving the actuator in accordance with a center-point error signal functioning as an error signal for a center point position of the objective lens in the tracking direction to execute center-point servo for setting the objective lens to the center point position; and layer jump sequence control means for performing a series of layer jump operations of causing the tracking servo means to turn off the tracking servo, causing the focus servo means to turn off the focus servo to cause the layer movement driving means to perform the movement of the objective lens in the interlayer direction, causing the focus servo means to turn on the focus servo, and causing the tracking servo means to turn on the tracking servo and for causing the center-point servo means to execute the center-point servo in a predetermined time within a period during which the series of layer jump operations is performed.

The layer jump sequence control means may cause the center-point servo means to execute the center-point servo in a predetermined time before the layer movement driving means starts the movement in the interlayer direction within the period during which the series of layer jump operations is performed.

The layer jump sequence control means may cause the center-point servo means to execute the center-point servo in a predetermined time after the layer movement driving means completes the movement in the interlayer direction within the period during which the series of layer jump operations is performed.

The layer jump sequence control means may cause the center-point servo means to execute the center-point servo during the movement in the interlayer direction performed by the layer movement driving means within the period during which the series of layer jump operations is performed.

A layer jump method according to an embodiment of the present invention includes the steps of turning off tracking servo; turning off focus servo to perform movement of an objective lens in an interlayer direction; turning on the focus servo; turning on the tracking servo; and executing center-point servo for setting the objective lens to a center point position in a tracking direction in a predetermined time within a period during which layer jump operations from the step of turning off the tracking servo to the step of turning on the tracking servo are performed.

The step of executing the center-point servo may be performed within a period from the step of turning off the tracking servo to the step of turning off the focus servo to perform the movement of the objective lens in the interlayer direction.

The step of executing the center-point servo may be performed within a period from the step of turning on the focus servo to the step of turning on the tracking servo.

The step of executing the center-point servo may be performed within a period during which the movement in the interlayer direction is performed.

In other words, in a series of layer jump operations including turning off of the tracking servo, turning off of the focus servo, interlayer movement, a focus servo pull-in operation by turning on of the focus servo control after the interlayer movement, and a tracking servo pull-in operation by turning on of the tracking servo control, during a certain time, the center-point servo is turned on, and oscillation of the objective lens in the tracking direction is quickly stabilized under the control of the center-point servo. In other words, since the oscillation of the objective lens (actuator) caused by the influence of eccentricity and the like when the tracking servo is turned off is stabilized by the center-point servo, a waiting time until oscillation stabilizes can be reduced.

The center-point servo may be turned on before interlayer movement, during the interlayer movement, or after the interlayer movement. Alternatively, the center-point servo may be turned on before and after the interlayer movement, in the period before and during the interlayer movement, in the period during and after the interlayer movement, in the period before, during, and after the interlayer movement.

Accordingly, when a series of layer jump operations is performed, the center-point servo is turned on during a certain time. Oscillation of the objective lens (an actuator holding the objective lens) in the tracking direction is stabilized under the control of the center-point servo, and the stabilization is achieved in a shorter time. Thus, a time required for the stabilization is reduced. Accordingly, the stability of the series of layer jump operations and a reduction in the time required for the series of layer jump operations can be achieved.

Turning on the center-point servo before start of interlayer movement rapidly suppresses oscillation in the tracking direction before jump. Thus, a waiting time until start of interlayer movement (until stabilization of oscillation) can be reduced. In addition, since the oscillation in the tracking direction is suppressed before jump, the influence of large oscillation in the tracking direction as cross action in the focus direction during jump can be suppressed, and an operation during the interlayer movement can be stabilized. Furthermore, when the tracking servo pull-in operation is performed after jump, the influence of eccentricity of a layer before jump is not exerted, and the tracking servo pull-in operation can be performed stably and rapidly.

Turning on the center-point servo after interlayer movement rapidly suppresses oscillation in the tracking direction after jump. Thus, the tracking servo pull-in operation can be stabilized, and a time until start of the pull-in operation and a time required for the pull-in operation can be reduced.

Turning on the center-point servo during interlayer movement suppresses oscillation in the tracking direction during interlayer movement, suppresses the influence in the focus direction caused by cross action, and stabilizes an operation during the interlayer movement. In addition, when the tracking servo pull-in operation is performed after jump, the influence of eccentricity of the layer before jump is not exerted, and the tracking servo pull-in operation can be performed stably and rapidly.

BRIEF DESCRIPTION OF THE DRAWINGS

FIG. 13A is an explanatory diagram showing a stabilization time in a known example; and FIG. 13B is an explanatory diagram showing a stabilization time in the embodiment.

DESCRIPTION OF THE PREFERRED EMBODIMENTS

A disc drive apparatus as an example of a playback apparatus according to an embodiment of the present invention and a layer jump method performed by the disc drive apparatus will be described. Configuration examples of the disc drive apparatus according to this embodiment will be described as first and second configuration examples. Examples of a layer jump sequence process implemented in the first or second configuration example will be explained as first, second, and third examples of a layer jump process.

Figure 1:
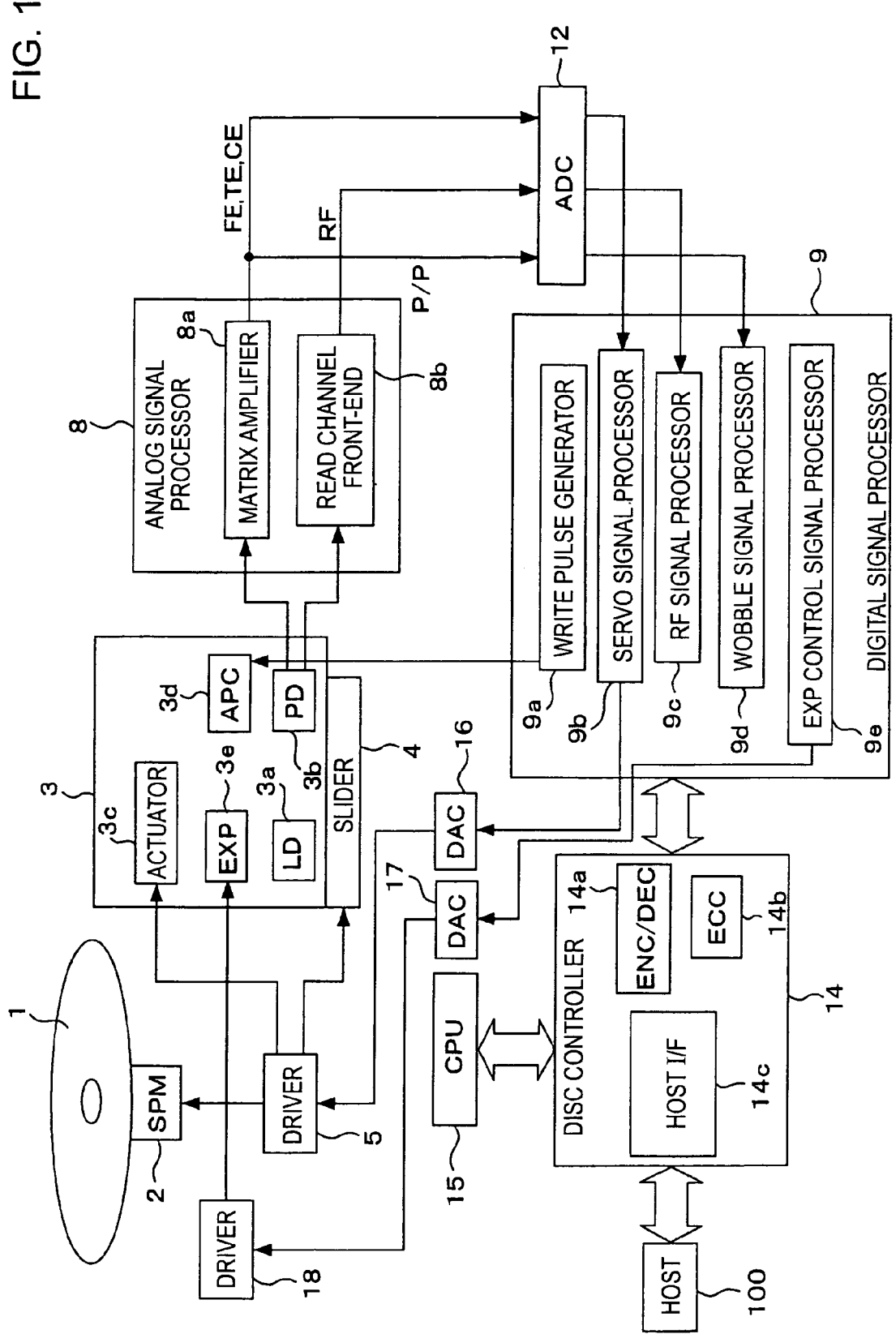
FIG. 1 is a block diagram showing a first configuration example of a disc drive apparatus according to an embodiment of the present invention.

FIG. 1 shows the first configuration example of the disc drive apparatus according to this embodiment.

A disc 1, which is a recording medium, is, for example, a playback-only read-only memory (ROM) optical disc, a phase-change rewritable disc, or a pigment-change write-once disc. A multilayer disc having two or more recording layers on which data is recorded is used, as well as a single-layer disc.

The disc 1 is placed on a turntable (not shown). In a recording/playback operation, a spindle motor 2 rotates and drives the disc 1 at a constant linear velocity (CLV) or at a constant angular velocity (CAV). A pickup 3, which is an optical head for recording/playback, reads data recorded on the disc 1 as embossed pits, pigment-change pits, phase-change pits, or the like and address in pregroove (ADIP) information formed by a wobbling groove in the disc.

The pickup 3 includes a laser diode 3a functioning as a laser light source, a photodetector 3b for detecting reflected light, a biaxial actuator 3c that holds an objective lens functioning as an output terminal of laser light, an automatic power control (APC) circuit 3d that controls the laser light output from the laser diode 3a, and an optical system (not shown) that irradiates a disc recording surface with the laser light via the objective lens and that guides the reflected light to the photodetector 3b. In addition, an expander lens mechanism 3e functioning as a spherical aberration correction mechanism is provided in a laser path formed by the optical system.

The biaxial actuator 3c holds the objective lens such that the objective lens is capable of moving in a tracking direction and in a focus direction. A triaxial actuator that is capable of performing control in a tilt direction, that is, in a direction of a tilt between the optical axis and the disc 1, as well as in the tracking direction and in the focus direction, may be used.

In addition, a slider 4 allows the entire pickup 3 to move in a radial direction of the disc.

Reflection information from the disc 1 is detected by the photodetector 3b, and is supplied to an analog signal processor 8 as an electric signal corresponding to the amount of light received.

In the analog signal processor 8, a matrix amplifier 8a performs a matrix operation for signals in light-receiving portions of the photodetector 3b. The matrix amplifier 8a generates, for example, a focus error signal FE, a tracking error signal TE, and a center-point error signal CE for servo control. The matrix amplifier 8a also generates a push/pull signal P/P as information on a wobbling groove.

In addition, in the analog signal processor 8, a read channel front-end 8b performs filter processing and gain processing to generate a playback RF signal.

Each of the RF signal, the focus error signal FE, the tracking error signal TE, the center-point error signal CE, and the push/pull signal P/P is converted into a digital signal in an analog-to-digital (A/D) converter 12, and input to a digital signal processor 9.

The digital signal processor 9 includes a write pulse generator 9a, a servo signal processor 9b, an RF signal processor 9c, a wobble signal processor 9d, and an expander control signal processor 9e.

The push/pull signal P/P, which is generated by the matrix amplifier 8a and converted into a digital signal in the A/D converter 12, is decoded in the wobble signal processor 9d, and ADIP information is extracted. An address, physical format information, and the like that are acquired as ADIP information are supplied via a disc controller 14 to a CPU 15.

The servo signal processor 9b generates various servo drive signals for focus servo, tracking servo, center-point servo, slide servo, and spindle servo from the input focus error signal FE, tracking error signal TE, center-point error signal CE, and for example, rotation speed information detected by PLL processing or the like in the RF signal processor 9c, and causes servo operations to be performed.

Such servo drive signals for the corresponding servo are supplied via a digital-to-analog (D/A) converter 16 to a servo driver circuit S. The servo driver circuit 5 drives the biaxial actuator 3c, and causes operations as the focus servo, the tracking servo, and the center-point servo to be performed in accordance with servo drive signals for the focus servo, the tracking servo, and the center-point servo.

In addition, the servo driver circuit 5 drives the slider 4 in accordance with a slide servo drive signal, and causes the slider 4 to transfer the pickup 3. The servo driver circuit 5 also rotates and drives the spindle motor 2 in accordance with a spindle servo drive signal.

In addition, the servo signal processor 9b supplies each of the above-mentioned signals to the servo driver circuit 5 such that operations, such as focus search, layer jump, track jump, and seek, are performed in accordance with instructions from the CPU 15.

The RF signal, which is generated by the read channel front-end 8b and converted into a digital signal in the A/D converter 12, is digitally processed by the RF signal processor 9c, and is supplied to the disc controller 14.

The disc controller 14 includes an encoder/decoder 14a, an ECC processor 14b, and a host interface 14c.

In the disc controller 14, in the process of playback, the encoder/decoder 14a decodes data supplied from the RF signal processor 9c, and the ECC processor 14b performs error correction processing. Accordingly, playback data is acquired.

In addition, the disc controller 14 extracts sub-code information, address information, management information, and additional information from among information acquired by decoding processing, and supplies such information to the CPU is.

The playback data is transferred from the host interface 14c to an external host apparatus 100 (for example, a personal computer) under the control of the CPU 15 functioning as a controller of the disc drive apparatus.

In other words, the CPU 15 performs communication using playback data, read/write commands, and the like with the host apparatus 100 via the host interface 14c. The CPU 15 controls playback processing of the disc 1 and transfers decoded playback data in accordance with a read command from the host apparatus 100.

In addition, the CPU 15 causes a recording operation for the disc 1 to be performed by supplying a write command and recording data from the host apparatus 100.

In addition, the CPU 15 gives the digital signal processor 9 various instructions to perform a servo operation, a signal processing operation, and the like.

In addition, the CPU 15 recognizes, using an inner sensor, that the disc 1 is inserted and that the disc 1 is reliably installed (chucked) on the spindle motor 2.

In the process of recording data, the ECC processor 14b adds an error correction code to recording data supplied from the host apparatus 100, and the encoder/decoder 14a encodes the recording data including the added error correction code.

The encoded recording data is supplied to the write pulse generator 9a of the digital signal processor 9. The write pulse generator 9a performs waveform shaping on the encoded recording data, and supplies the processed data as laser modulation data to the APC circuit 3d.

The APC circuit 3d drives the laser diode 3a in accordance with the laser modulation data, and causes the laser diode 3a to output laser light corresponding to the recording data. Accordingly, data is written into the disc 1.

If the disc 1 is a rewritable disc having a phase-change recording layer, the crystal structure of the recording layer changes in accordance with heating using laser light, and a phase-change pit is formed. In other words, various data is recorded by selecting between the presence and absence of a pit and by changing the length of the pit. In addition, when laser light is applied again to a portion in which the pit is formed, the crystal structure changed when the data is recorded is returned to the original state by heating, and data is deleted by absence of the pit.

The expander control signal processor 9e drives and controls the expander lens mechanism 3e, which is a spherical aberration correcting mechanism, in accordance with an instruction from the CPU 15, and causes the expander lens mechanism 3e to perform spherical aberration adjustment corresponding to a recording layer of the disc 1.

A control signal from the expander control signal processor 9e is supplied via a D/A converter 17 to an expander driver circuit 18. The expander driver circuit 18 drives the expander lens mechanism 3e, and causes the expander lens mechanism 3e to perform spherical aberration adjustment.

Figure 2:
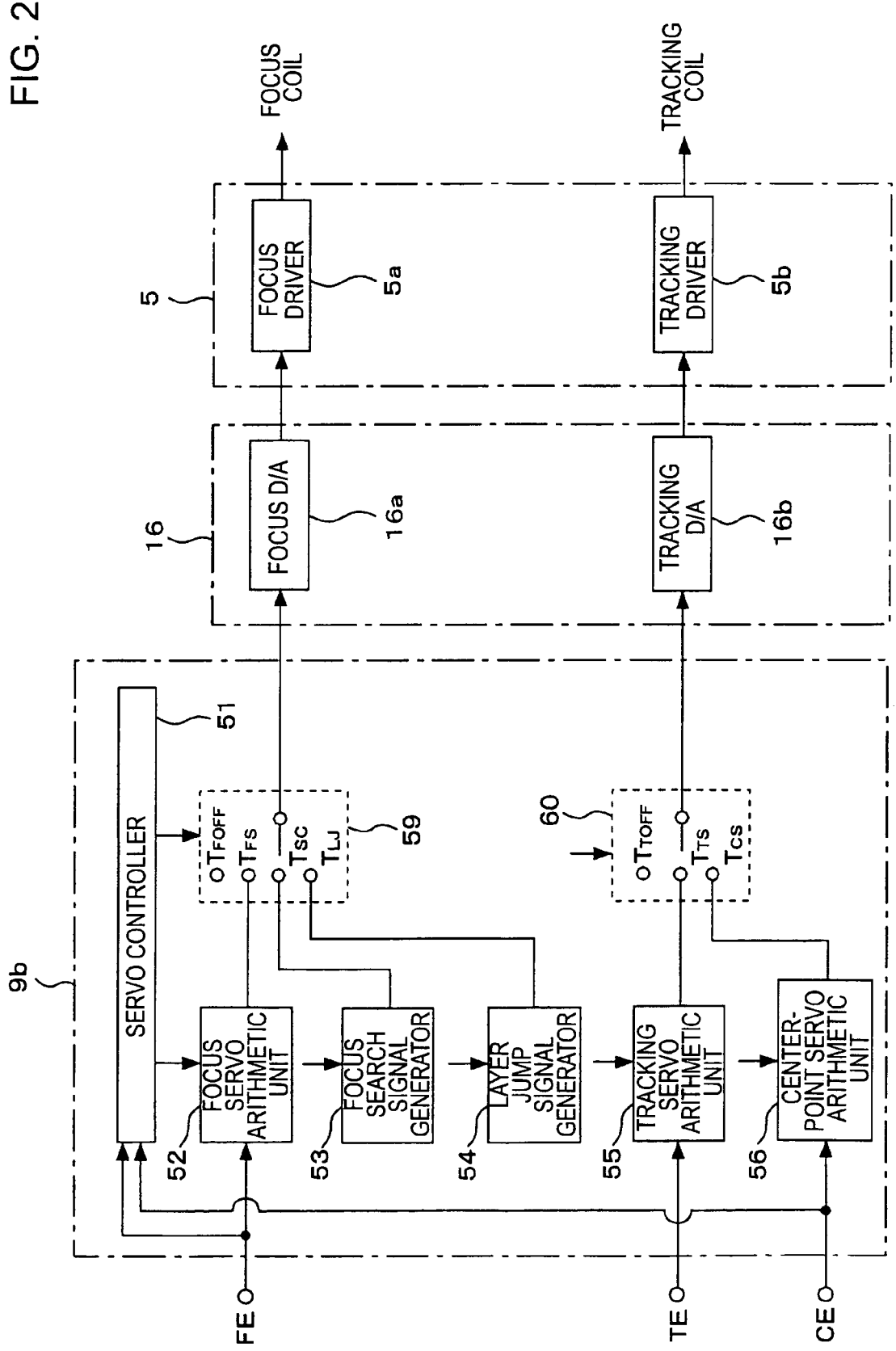
FIG. 2 is a block diagram showing the configuration of a focus servo system and a tracking servo system according to the embodiment.

The configuration of the servo signal processor 9b is described next with reference to FIG. 2. As described above, although the servo signal processor 9b performs signal processing for servo operations of the focus servo, the tracking servo, the center-point servo, the slide servo, and the spindle servo, only a focus control system and a tracking control system are shown in FIG. 2. In other words, only signal processing systems for the biaxial actuator 3c are shown in FIG. 2.

The focus control system has a configuration for performing focus servo control, focus search, and layer jump. Thus, the servo signal processor 9b includes a focus servo arithmetic unit 52, a focus search signal generator 53, a layer jump signal generator 54, and a switch unit 59.

The tracking control system has a configuration for performing tracking servo control and center-point servo control. Thus, the servo signal processor 9b includes a tracking servo arithmetic unit 55, a center-point servo arithmetic unit 56, and a switch unit 60.

Referring to FIG. 2, a servo controller 51 controls signal processing for the focus control system and the tracking control system in accordance with instructions from the CPU 15, and controls switching of switch units 59 and 60. In particular, for layer jump processing, which is a feature of this embodiment, the servo controller 51 performs sequence control for operations for layer jump, and the servo controller 51 functions as a layer jump sequence controller.

A focus error signal FE supplied from the A/D converter 12 shown in FIG. 1 is input to the focus servo arithmetic unit 52.

The focus servo arithmetic unit 52 performs filtering processing, loop gain processing, and the like for the focus error signal FE for phase compensation, and generates a focus servo signal.

In order to turn on a focus servo loop, the servo controller 51 connects the switch unit 59 to a terminal TFS. In this state, the focus servo signal generated by the focus servo arithmetic unit 52 in accordance with the focus error signal FE is supplied via a focus D/A converter 16a in the D/A converter 16 to a focus driver 5a in the servo driver circuit 5. The focus driver 5a applies a current to a focus coil of the biaxial actuator 3c in accordance with the supplied focus servo signal. Accordingly, a focus servo operation for maintaining an in-focus state for a recording layer is performed.

The focus search signal generator 53 generates and outputs a focus search driving signal for forcefully driving the objective lens so that a focus servo pull-in operation is performed.

For focus search, in a state in which the servo controller 51 connects the switch unit 59 to a terminal TSC and turns off the focus servo, the focus search driving signal generated by the focus search signal generator 53 is supplied via the focus D/A converter 16a to the focus driver 5a. When the focus driver 5a supplies to the focus coil of the biaxial actuator 3c a driving current corresponding to the focus search driving signal, the objective lens is moved for searching. When the switch unit 59 is switched to the terminal TFS at around zero-crossing timing of an S-shaped waveform of a focus error signal and the focus servo is turned on, the focus servo pull-in operation is performed.

The layer jump signal generator 54 generates and outputs a layer jump driving signal. As described later with reference to FIG. 9, the layer jump signal generator 54 generates a kick pulse and a brake pulse as a layer jump driving signal.

For layer jump, in a state in which the servo controller 51 connects the switch unit 59 to a terminal TLJ and turns off the focus servo, the layer jump driving signal generated by the layer jump signal generator 54 is supplied via the focus D/A converter 16a to the focus driver 5a.

When the focus driver 5a supplies to the focus coil of the biaxial actuator 3c a driving current corresponding to the layer jump driving signal, the objective lens jumps and moves. When the switch unit 59 is switched to the terminal TFS at around zero-crossing timing of an S-shaped waveform of a focus error signal after jump and the focus servo is turned on, a focus servo pull-in operation in a recording layer of the jump destination is performed.

A tracking error signal TE supplied from the A/D converter 12 shown in FIG. 1 is input to the tracking servo arithmetic unit 55.

The tracking servo arithmetic unit 55 performs filtering processing, loop gain processing, and the like for the tracking error signal TE for phase compensation, and generates a tracking servo signal.

In order to turn on the tracking servo, the servo controller 51 connects the switch unit 60 to a terminal TTS. In this state, the tracking servo signal generated by the tracking servo arithmetic unit 55 in accordance with the tracking error signal TE is supplied via a tracking D/A converter 16b in the D/A converter 16 to a tracking driver 5b in the servo driver circuit 5. The tracking driver 5b applies a current to a tracking coil of the biaxial actuator 3c in accordance with the supplied tracking servo signal. Accordingly, a tracking servo operation for maintaining a state in which a recording track on a recording layer is traced with laser light is performed.

A center-point error signal CE supplied from the A/D converter 12 shown in FIG. 1 is input to the center-point servo arithmetic unit 56.

The center-point servo arithmetic unit 56 performs filtering processing, loop gain processing, and the like for the center-point error signal CE for phase compensation, and generates a center-point servo signal.

The center-point servo controls the objective lens to a center point position in the biaxial actuator 3c. In order to turn on the center-point servo, the servo controller 51 connects the switch unit 60 to a terminal TCS. In this state, the tracking servo is turned off, and the center-point servo signal generated by the center-point servo arithmetic unit 56 in accordance with the center-point error signal CE is supplied via the tracking D/A converter 16b to the tracking driver 5b. The tracking driver 5b applies a current to the tracking coil of the biaxial actuator 3c in accordance with the supplied center-point servo signal. Accordingly, a center-point servo operation for maintaining the position of the objective lens to the center point is performed.

The servo controller 51 controls operations of the focus servo arithmetic unit 52, the focus search signal generator 53, the layer jump signal generator 54, the tracking servo arithmetic unit 55, and the center-point servo arithmetic unit 56.

In addition, the servo controller 51 performs switching control for the switch units 59 and 60.

When the servo controller 51 causes the switch unit 59 to be connected to a terminal TFOFF, the operation of the focus system is turned off. When the servo controller 51 causes the switch unit 60 to be connected to a terminal TTOFF, both the tracking servo and the center-point servo are turned off.

In addition, the servo controller 51 monitors a focus error signal FE and a center-point error signal CE in order to perform sequence control for layer jump processing and the like.

With the configuration shown in FIG. 2, the focus servo arithmetic unit 52, the focus D/A converter 16a, and the focus driver 5a function as a focus servo section. The layer jump signal generator 54, the focus D/A converter 16a, and the focus driver 5a function as a layer movement driving section.

The tracking servo arithmetic unit 55, the tracking D/A converter 16b, and the tracking driver 5b function as a tracking servo section. The center-point servo arithmetic unit 56, the tracking D/A converter 16b, and the tracking driver 5b function as a center-point servo section.

An example of the configuration of an optical system within the pickup 3 and a spherical aberration adjustment mechanism are described next with reference to FIG. 3.

Figure 3:
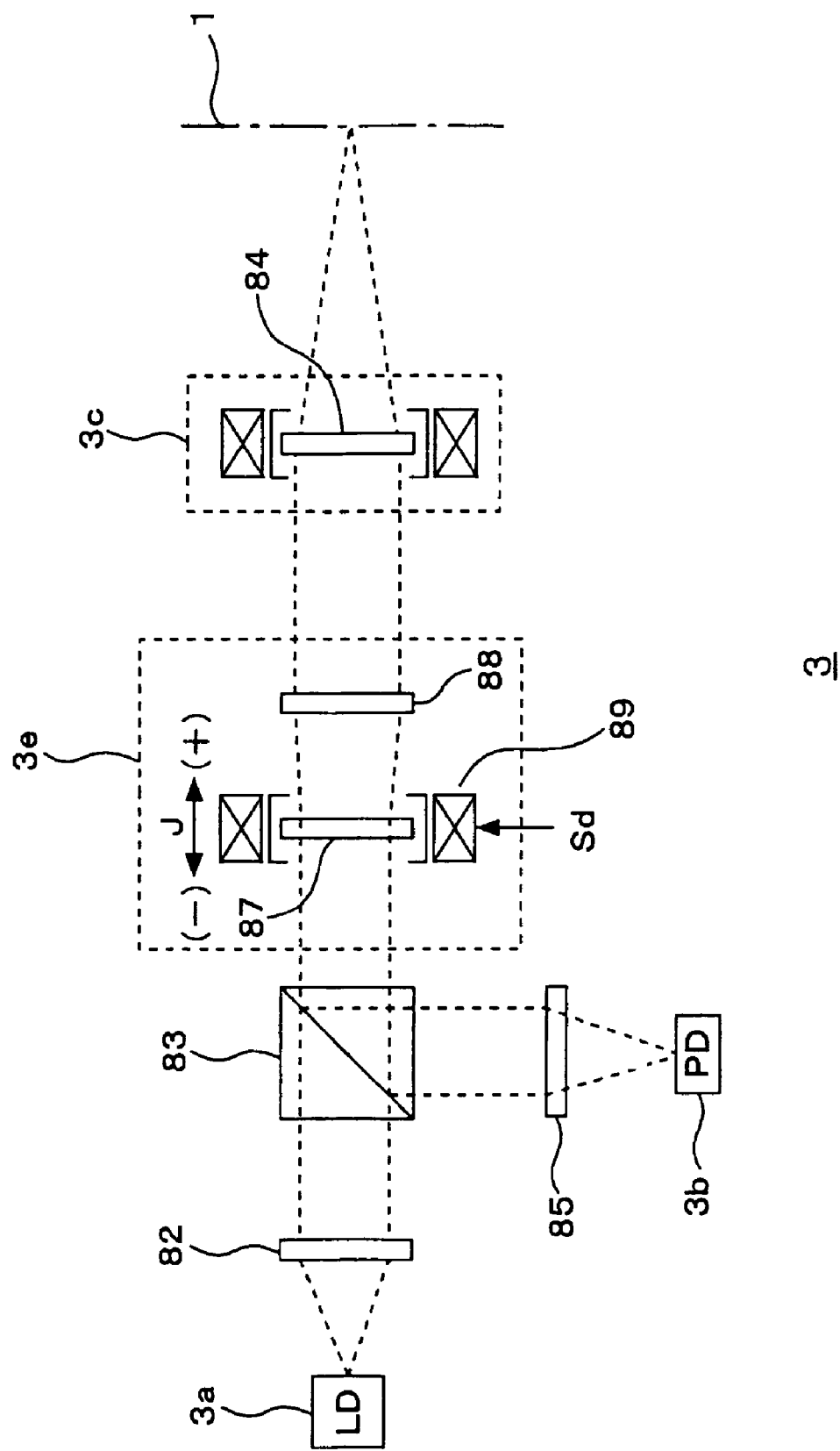
FIG. 3 is an explanatory diagram showing a configuration example for spherical aberration correction according to the embodiment.

Referring to FIG. 3, laser light output from the laser diode 3a is converted into parallel light beams by a collimator lens 82. The parallel light beams pass through a beam splitter 83, and proceed to an objective lens 84 via a movable lens 87 and a fixed lens 88, which are correcting lenses in the expander lens mechanism 3e for spherical aberration adjustment. The light beams are irradiated from the objective lens 84 to the disc 1. In the expander lens mechanism 3e, a spherical aberration adjustment actuator 89 drives the movable lens 87 to perform spherical aberration adjustment.

Reflected light from the disc 1 proceeds to the beam splitter 83 via the objective lens 84, the fixed lens 88, and the movable lens 87. The reflected light from the disc 1 is reflected by the beam splitter 83, and is incident to the photodetector 3b via a condenser lens 85.

In the above-described optical system, the objective lens 84 is supported by the biaxial actuator 3c such that the objective lens 84 can move in the focus direction and in the tracking direction, and the focus servo operation, the tracking servo operation, and the like can be performed, as described above.

In addition, the expander lens mechanism 3e has a function to change the diameter of laser light. In other words, the spherical aberration adjustment actuator 89 allows the movable lens 87 to move in a J direction, Which is an optical axis direction. The diameter of laser light applied to the disc 1 is adjusted in accordance with the movement of the movable lens 87.

In other words, when the expander driver circuit 18 shown in FIG. 1 supplies a driving signal to the spherical aberration adjustment actuator 89 to move the movable lens 87 back and forth in the optical axis direction, spherical aberration adjustment can be performed. For example, spherical aberration adjustment is performed for a corresponding recording layer. For example, for a dual-layer disc, the amount of movement of the movable lens 87 to be moved for layer jump between a first recording layer and a second recording layer is set. The expander control signal processor 9e outputs a control signal such that the movable lens 87 is moved by the set amount of movement.

Figure 4:
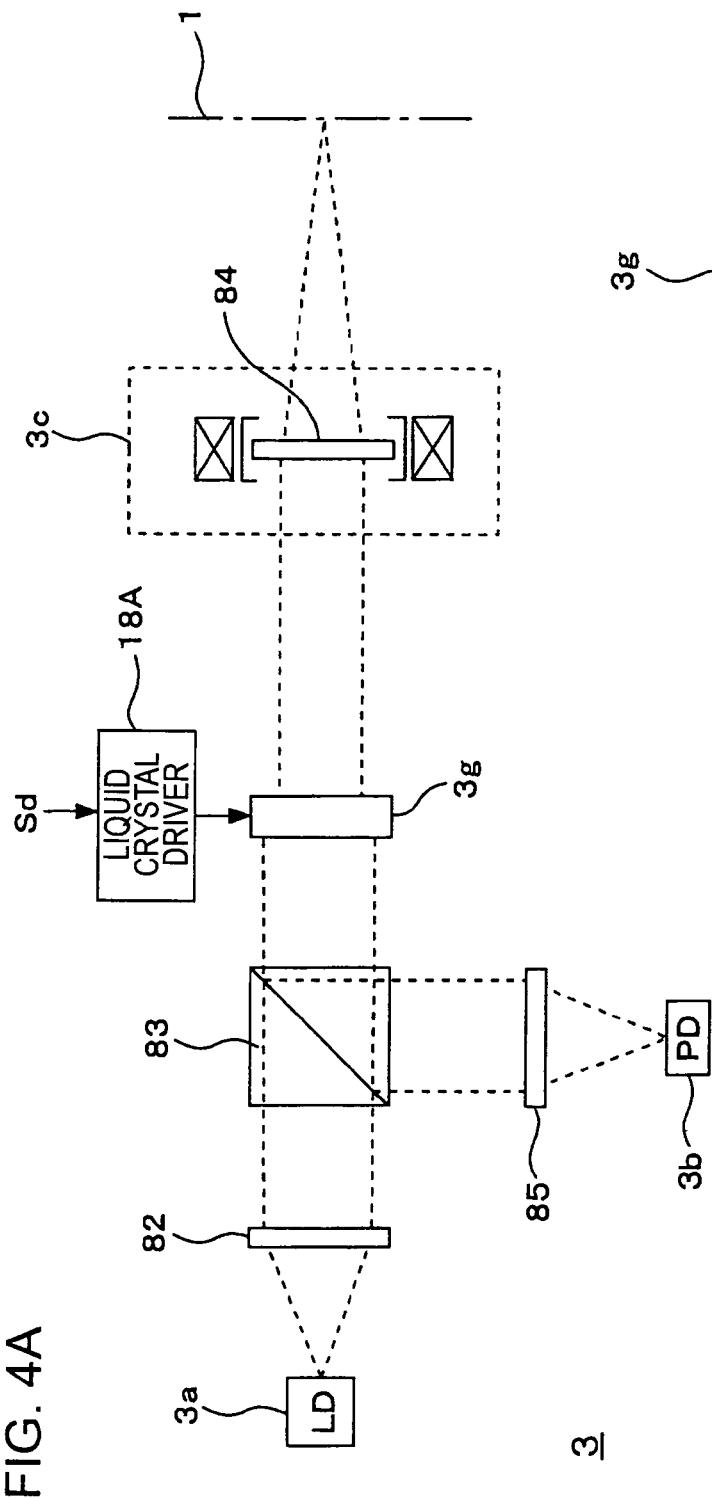
FIGS. 4A and 4B are explanatory diagrams showing another configuration example for spherical aberration correction according to the embodiment.

Spherical aberration adjustment may be performed using a liquid crystal panel. FIG. 4A shows a case where an optical system similar to that in FIG. 3 includes a liquid crystal panel 3g instead of the expander lens mechanism 3e.

In other words, in the liquid crystal panel 3g, by changing the boundary between an area in which laser light passes through and an area in which the laser light is intercepted, as shown by the solid line, the broken line, and the alternate long and short dash line in FIG. 4B, the diameter of laser light can be changed.

In other words, in this case, with the configuration shown in FIG. 1, the liquid crystal panel 3g and a liquid crystal driver circuit 18A are provided, instead of the expander lens mechanism 3e and the expander driver circuit 18. In addition, the digital signal processor 9 includes a liquid crystal control signal processor, instead of the expander control signal processor 9e. When the liquid crystal control signal processor outputs a control signal to the liquid crystal driver circuit 18A, which drives the liquid crystal panel 3g, to change a transmission area, spherical aberration correction can be performed.

An example of the configuration for generating a center-point error signal CE in the configuration shown in FIG. 1 is described next with reference to FIG. 5.

Figure 5:
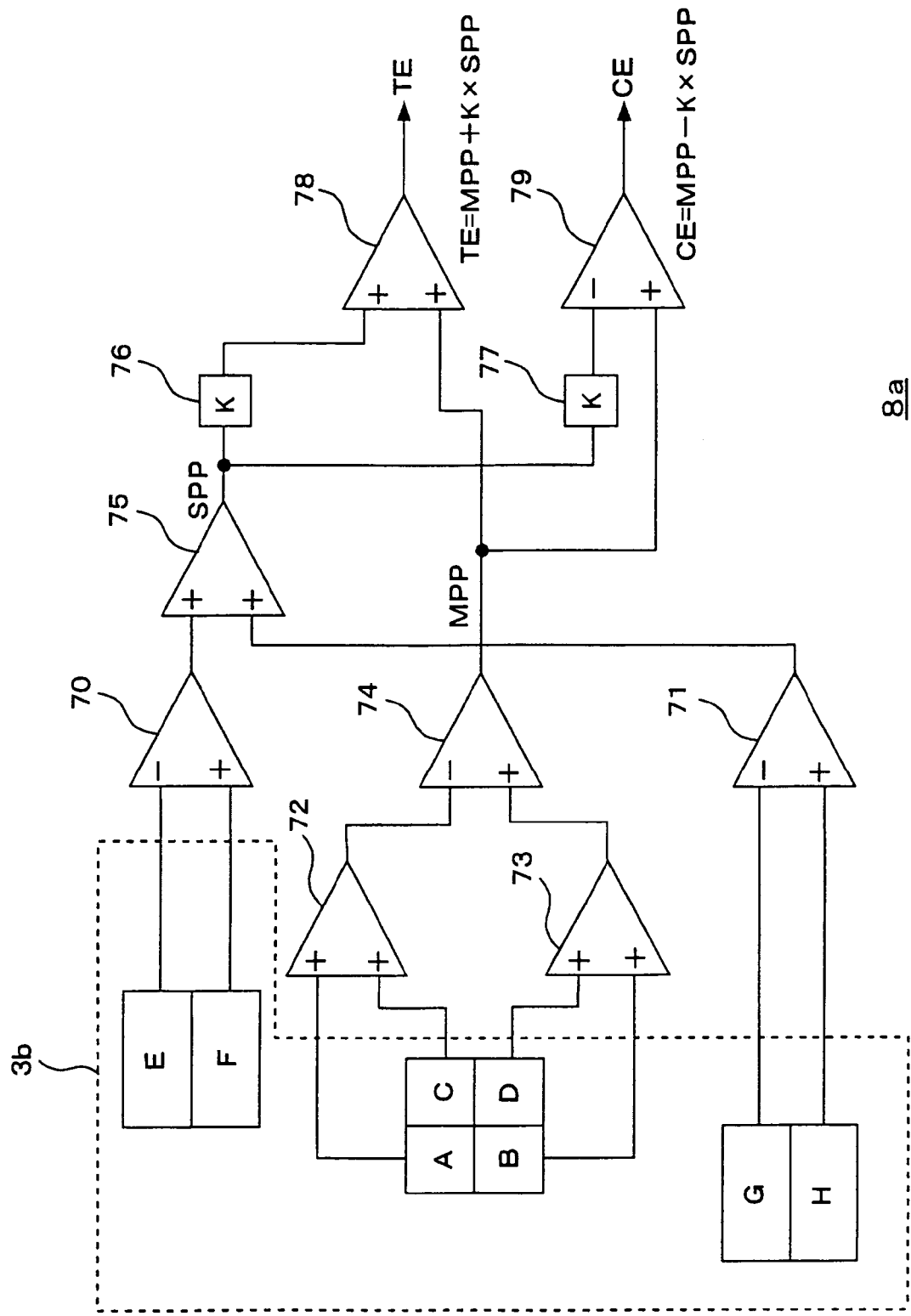
FIG. 5 is an explanatory diagram showing a configuration for generating a center-point error signal according to the embodiment.

FIG. 5 shows light-receiving surfaces A, B, C, D, E, F, G, and H as the photodetector 3b and a circuit as an arithmetic circuit within the matrix amplifier 8a for generating a tracking error signal TE and a center-point error signal CE.

The light-receiving surfaces A, B, C, and D are four-divided light-receiving surfaces for detecting reflected light of a main beam of laser light. The light-receiving surfaces E and F are two-divided light-receiving surfaces for detecting reflected light of a side beam applied to a position shifted by a half track from the main beam in the radial direction of the disc. Similarly, the light-receiving surfaces G and H are two-divided light-receiving surfaces for detecting reflected light of a side beam applied to a position shifted by a half track from the main beam in the radial direction of the disc.

An adder 72 adds detection signals of the light-receiving surfaces A and C, an adder 73 adds detection signals of the light-receiving surfaces B and D. A subtracter 74 subtracts an output of the adder 72 from an output of the adder 73. In other words, an output "(B+D)−(A+C)" from the subtracter 74 functions as a main push-pull signal MPP.

A subtracter 70 subtracts a detection signal of the light-receiving surface F from a detection signal of the light-receiving surface E, and a subtracter 71 subtracts a detection signal of the light-receiving surface H from a detection signal of the light-receiving surface G. An adder 75 adds outputs of the subtracters 70 and 71. In other words, an output "(E−F)+(G−H)" from the adder 75 functions as a side push-pull signal SPP.

An adder 78 adds the main push-pull signal MPP and the side push-pull signal SPP multiplied by a coefficient K in a multiplier 76, and an output of the adder 78, which is "MPP+K×SPP", functions as a tracking error signal TE.

In contrast, a subtracter 79 subtracts the side push-pull signal SPP multiplied by a coefficient K in a multiplier 77 from the main push-pull signal MPP, and an output of the subtracter 79, which is "MPP−K×SPP", functions as a center-point error signal CE.

Such a center-point error signal CE functions as information on error from a center point position of the objective lens 84 in the biaxial actuator 3c, and is supplied to the center-point servo arithmetic unit 56 of the servo signal processor 9b.

The second configuration example of the disc drive apparatus according to this embodiment is described next with reference to FIG. 6. The second configuration example is basically similar to the first configuration example shown in FIG. 1. The same parts as in the first configuration example are referred to with the same reference numerals and the descriptions of those same parts will not be repeated here.

In this example, a center-point error signal CE is acquired using a center-point sensor, instead of using reflected light from the disc 1. Thus, the pickup 3 includes a center-point error signal generator 3f that includes a center-point sensor and that generates a center-point error signal CE. The center-point error signal CE generated by the center-point error signal generator 3f is supplied via the A/D converter 12 to the servo signal processor 9b.

Figure 7:
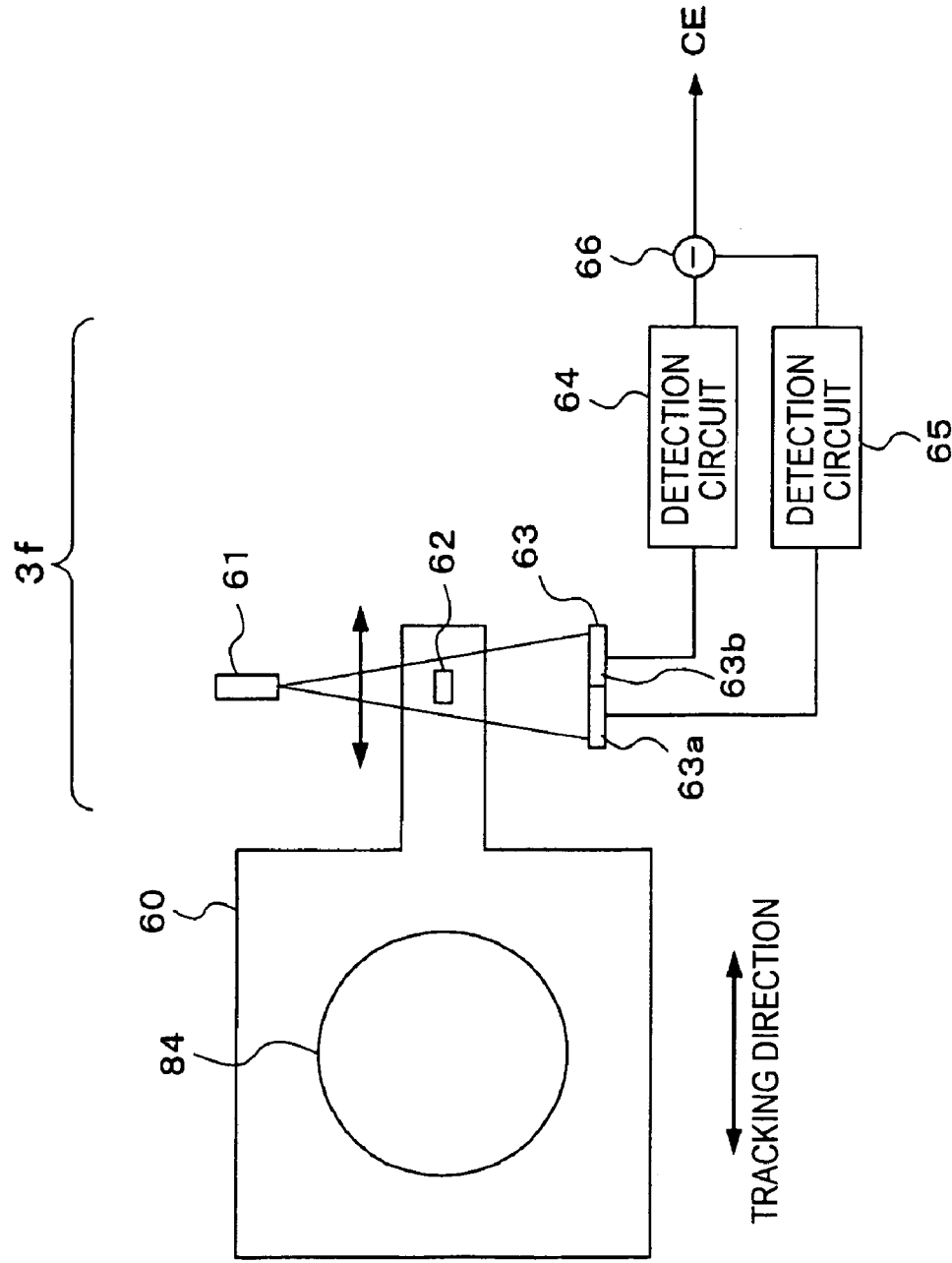
FIG. 7 is an explanatory diagram showing a configuration for generating a center-point error signal according to the embodiment.

The configuration of the center-point error signal generator 3f is described next with reference to FIG. 7. Referring to FIG. 7, the objective lens 84 is held by a lens holder 60 in the biaxial actuator 3c. A light-shielding plate 62 is mounted on part of the lens holder 60. When the objective lens 84 moves in the tracking direction, the light-shielding plate 62 also moves in the tracking direction.

The light-shielding plate 62 is located in a position on a path for light output from a light-emitting diode (LED) 61, and two-division photodetector 63 is located in the traveling direction of the light.

Output currents of light-receiving surfaces 63a and 63b of the two-division photodetector 63 are converted into voltage signals by detection circuits 64 and 65, respectively, and a subtracter 66 performs subtraction on the voltage signals. An output of the subtracter 66 functions as a center-point error signal CE.

When the objective lens 84 is located at a center point position, the light-shielding plate 62 is located at the center of incident optical paths to the light-receiving surfaces 63a and 63b, and the amounts of light incident to the light-receiving surfaces 63a and 63b are equivalently shielded. Thus, the center-point error signal CE, which is the difference in the amounts of light between the light-receiving surfaces 63a and 63b, is zero.

In contrast, when the objective lens 84 is displaced in the tracking direction, since the position of the light-shielding plate 62 is displaced, the amount of light received by one of the light-receiving surfaces 63a and 63b increases and the amount of light received by the other one of the light-receiving surfaces 63a and 63b decreases. Thus, a center-point error signal CE, which is the difference in the amounts of light between the light-receiving surfaces 63a and 63b, has a signal value corresponding to the displacement direction and the amount of displacement.

In a case where a center-point error signal CE is generated by a matrix operation using reflected light, as described in the first configuration example with reference to FIG. 5, when the focus servo is turned off, the reflected light is not properly detected and a center-point error signal CE is not acquired. However, in a case where the center-point sensor is used as in the second configuration example, a center-point error signal CE can be acquired irrespective of a state of the focus servo.

Layer jump performed by the disc drive apparatus according to this embodiment in the first or second configuration example is described next.

Figure 8:
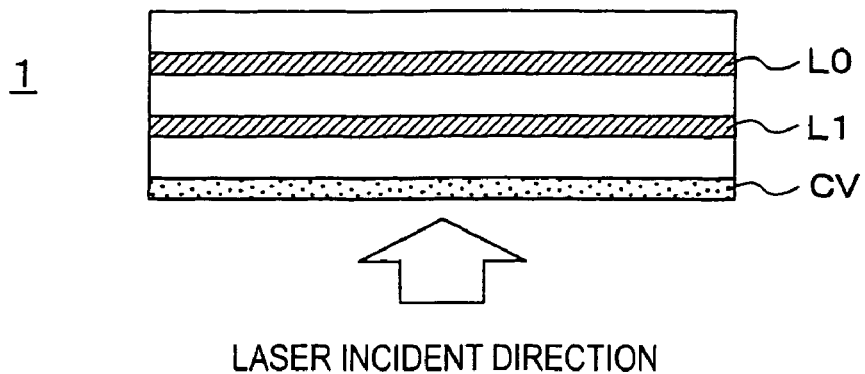
FIG. 8 is an explanatory diagram showing a dual-layer disc.

FIG. 8 shows a configuration example of recording layers when the disc 1 is a dual-layer disc. The arrow shown in FIG. 8 represents a direction of laser incidence from the pickup 3.

A cover layer CV is formed on a surface of the disc 1 close to the laser incidence side. A recording layer far from the laser incidence side is a layer 0, and a recording layer near the layer incidence side is a layer L1.

For example, in such a recording layer configuration, transition from a state in which recording/playback to/from a recording track of the layer L0 can be performed to a state in which recording/playback to/from a recording track of the layer L1 can be performed or transition from a state in which recording/playback to/from a recording track of the layer L1 can be performed to a state in which recording/playback to/from a recording track of the layer L0 can be performed is called "layer jump".

When layer jump is performed, the objective lens 84 held by the biaxial actuator 3c is forcefully moved in the focus direction. At that time, a kick pulse and a brake pulse are used as a layer jump driving signal to be supplied to the biaxial actuator 3c.

Figure 9:
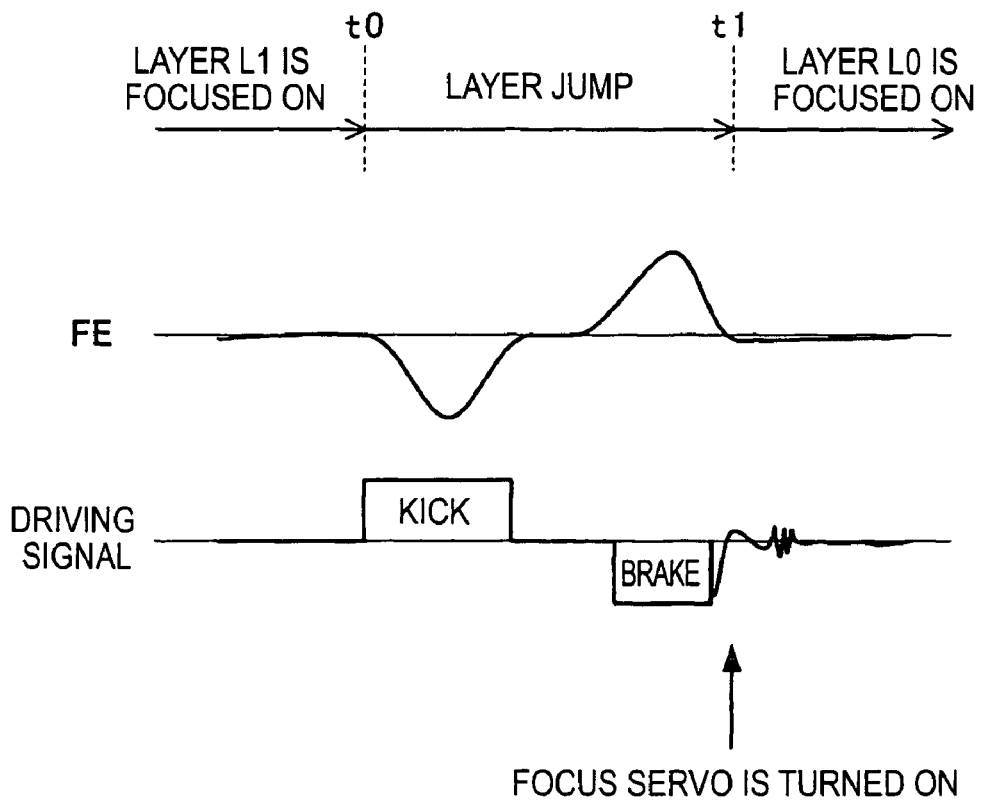
FIG. 9 is an explanatory diagram showing layer jump operations.

FIG. 9 shows a focus error signal FE observed when layer jump is performed and a layer jump driving signal generated by the servo signal processor 9b.

Referring to FIG. 9, until time t0, an in-focus state for the layer L1 of the disc 1 is achieved, that is, the layer L1 is focused on. Since the focus servo is turned on, the level of the observed focus error signal FE is about zero.

When layer jump starts at time t0, the tracking servo and the focus servo are turned off. A kick pulse is generated as a layer jump driving signal, and the objective lens 84 is forcefully moved in the focus direction by the biaxial actuator 3c. Thus, from time t0, a half of an S-shaped waveform is observed as a focus error signal FE near an in-focus point for the layer L1.

When the objective lens 84 continues to move, the front half of the S-shaped waveform is observed as a focus error signal FE near an in-focus point for the layer 0. For example, a brake pulse is applied as a layer jump driving signal while the front half of the S-shaped waveform is being observed, and the speed of the movement of the objective lens 84 is reduced. Then, the focus servo is turned on at time t1 of zero crossing of the S-shaped waveform, and an in-focus state for the layer L0 is achieved. After the focus servo pull-in operation is performed, the tracking servo is turned on and the tracking servo pull-in operation is performed. Accordingly, a state in which recording/playback to/from the destination layer L0 can be performed is achieved.

The application time and the application level of a kick pulse and a brake pulse for such layer jump can be adaptively changed in accordance with a jump direction and timing for generating an S-shaped waveform of a focus error signal FE. Thus, the difference in behavior due to face deflection and the difference in attitude can be compensated for.

For such layer jump, due to the influence of eccentricity of the disc 1 or eccentricity by a chucking state, when the tracking servo is turned off, oscillation of the objective lens 84 in the tracking direction increases. Thus, the increased oscillation badly affects the stability and rapidity of layer jump, as described above.

Accordingly, in this embodiment, by using a center-point servo when layer jump is performed, the stability and rapidity of layer jump can be improved.

Three processing examples of a layer jump process according to this embodiment will be described.

Figure 10:
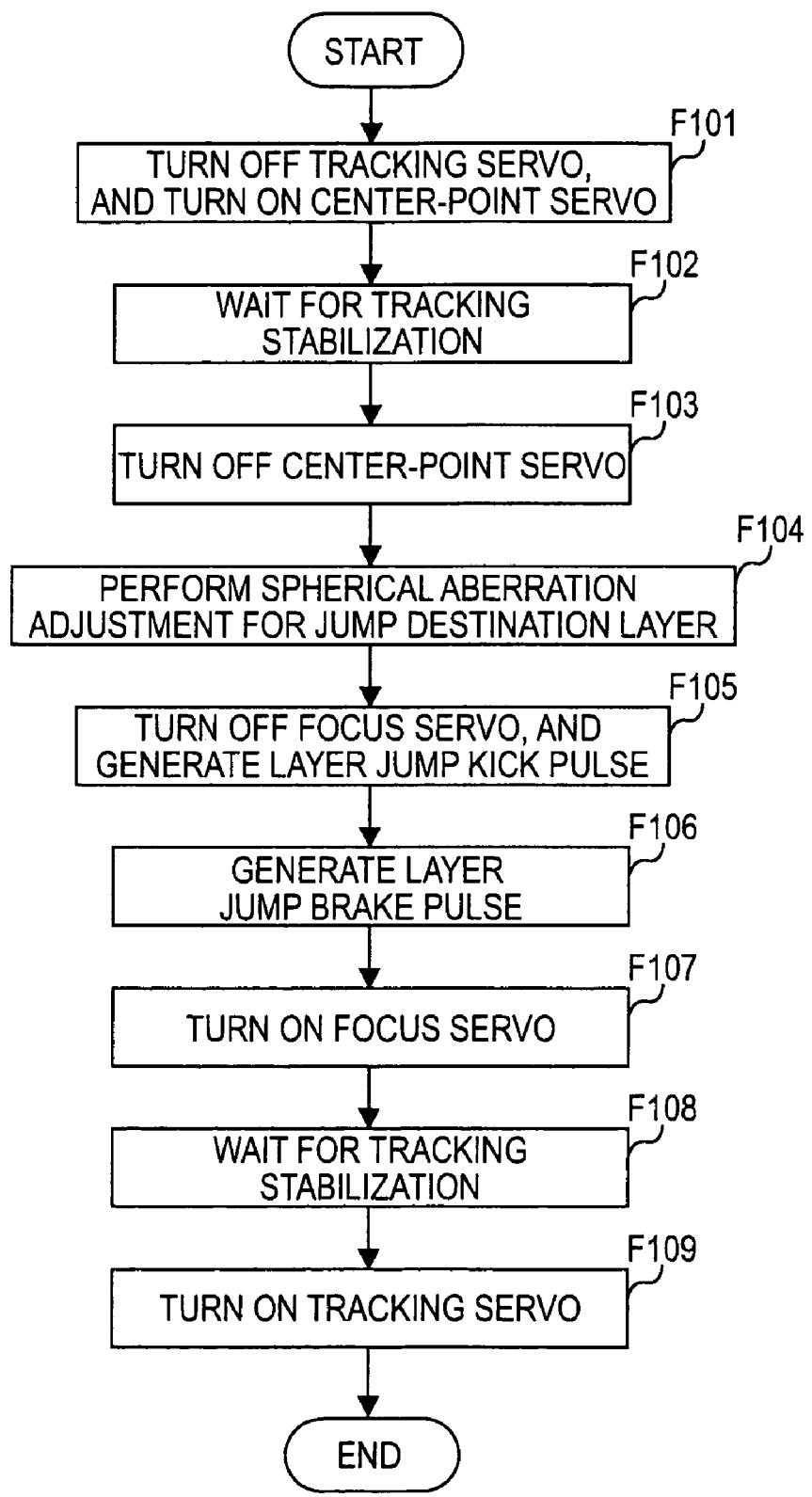
FIG. 10 is a flowchart showing a first example of a layer jump process according to the embodiment.

A first example of the layer jump process is described next with reference to FIG. 10. This layer jump process is layer jump sequence processing performed by the servo controller 51 shown in FIG. 2 in accordance with an instruction from the CPU 15.

For starting layer jump, the servo controller 51 turns off the tracking servo and turns on the center-point servo in step F101. In other words, the switch unit 60 shown in FIG. 2 is switched from the terminal TTS to the terminal TCS. Thus, immediately after the tracking servo is turned off, the biaxial actuator 3c operates such that the objective lens 84 is set to a center point position under the control of the center-point servo.

After the center-point servo is turned on, the servo controller 51 waits for stabilization of oscillation of the objective lens 84 in the tracking direction in step F102. The tracking stabilization can be determined when a center-point error signal CE is within a predetermined level range.

The servo controller 51 waits for tracking stabilization while monitoring the center-point error signal CE in step F102, and when it is determined that stabilization is achieved, the servo controller 51 turns off the center-point servo in step F103. In other words, the servo controller 51 switches the switch unit 60 to the terminal TTOFF.

In step F104, the servo controller 51 issues an instruction for spherical aberration adjustment for a jump destination layer. In response to the instruction, the expander control signal processor 9e outputs a control signal for the expander lens mechanism 3e, and causes the expander lens mechanism 3e to perform spherical aberration adjustment. As described above with reference to FIG. 4, spherical aberration adjustment may be performed as control for the liquid crystal panel 3g.

In step F105, the servo controller 51 turns off the focus servo, and starts layer jump movement. In other words, the servo controller 51 switches the switch unit 59 from the terminal TFS to the terminal TLJ, and causes the layer jump signal generator 54 to output a kick pulse.

Accordingly, the biaxial actuator 3c starts jump movement.

During the jump movement, the servo controller 51 monitors the waveform of a focus error signal FE, and at predetermined timing, the servo controller 51 causes the layer jump signal generator 54 to output a brake pulse in step F106. Thus, the speed of jump movement by the biaxial actuator 3c is reduced. For example, at the point in time when zero crossing of the S-shaped waveform of the focus error signal FE is detected, in step F107, the servo controller 51 switches the switch unit 59 from the terminal TLJ to the terminal TFS, and turns on the focus servo. Thus, the focus servo pull-in operation is performed.

After the focus servo pull-in operation is performed, in step F108, the servo controller 51 waits for tracking stabilization while monitoring the center-point error signal CE. When it is determined that tracking stabilization is achieved, the servo controller 51 turns on the tracing servo in step S109. In other words, the servo controller 51 switches the switch unit 60 from the terminal TTOFF to the terminal TTS. Thus, the tracking servo pull-in operation is performed, and a state in which recording/playback to/from the jump destination layer can be performed is achieved. Accordingly, a series of layer jump operations is completed.

A feature of the first example of the layer jump process is that the tracking servo is turned off and the center-point servo is turned on in step F101. This feature will be described.

FIGS. 13A and 13B show a time required for stabilization from a point in time when the tracking servo is turned off. A center-point error signal CE and thresholds th1 and th2 for determining stabilization are shown in each of FIGS. 13A and 13B. In other words, it is determined that tracking stabilization is achieved when the center-point error signal CE is within a level range between the thresholds th1 and th2.

FIG. 13A shows a case where the center-point servo is not turned on after the tracking servo is turned off, that is, a case where a known operation system is adopted. FIG. 13B shows a case where the tracking servo is turned off and the center-point servo is turned on in an operation system according to this embodiment.

For example, the layer jump sequence starts at time t21. In a period before time t21, the tracking servo is on and laser light follows the track. Since tracking servo control corresponding to eccentricity of the disc 1 is performed in this period, the error value of a center-point error signal CE varies in a rotation cycle.

For the known system shown in FIG. 13A, when the layer jump sequence starts at time t21 and the tracking servo is turned off, the objective lens 84 suddenly changes from a state in which the objective lens 84 oscillates under the tracking servo control in a rotation cycle to a free state. Thus, the objective lens 84 oscillates at a resonance frequency f0 of the biaxial actuator 3c for a while, and from time t21, the center-point error signal CE is observed as shown in FIG. 13A.

In the known system, in order to avoid the influence of such oscillation when layer jump is performed, jump movement starts after waiting for tracking stabilization. However, the center-point error signal CE does not settle down in the level range between the thresholds th1 and th2 until it reaches time t23. In addition, since oscillation is not especially controlled for convergence, even after it is determined that tracking stabilization is achieved, the objective lens continues to oscillate.

In contrast, in this embodiment, as shown in FIG. 13B, at time t21 when the layer jump sequence starts, the tracking servo is turned off and the center-point servo is turned on. Thus, under the control of the center-point servo, the oscillation of the objective lens 84 quickly converges, and it is determined that tracking stabilization is achieved, for example, at time 22, which is much faster than time t23. In addition, since oscillation is suppressed by the center-point servo, the oscillation does not continue after convergence.

As described above, according to the process shown in FIG. 10, a time necessary for waiting for tracking stabilization in step F102 can be significantly reduced compared with the known system.

In addition, since oscillation in the tracking direction is suppressed by the center-point servo, the influence of oscillation in the tracking direction due to eccentricity of a layer before jump is eliminated in jump movement and after jump. Thus, the influence of the oscillation in the tracking direction on movement in the focus direction as cross action during jump is reduced. In addition, since the oscillation caused by the eccentricity of the layer before jump has already been suppressed, a long time is not required for the processing in step F108 for waiting for tracking stabilization. In addition, since the tracking servo pull-in operation is performed in step F109 with less oscillation in the tracking direction, the tracking servo pull-in operation can be stably performed in a short time.

As described above, according to the first example of the layer jump process in which the center-point servo is turned on before jump movement starts, layer jump is performed stably in a short time.

Figure 6:
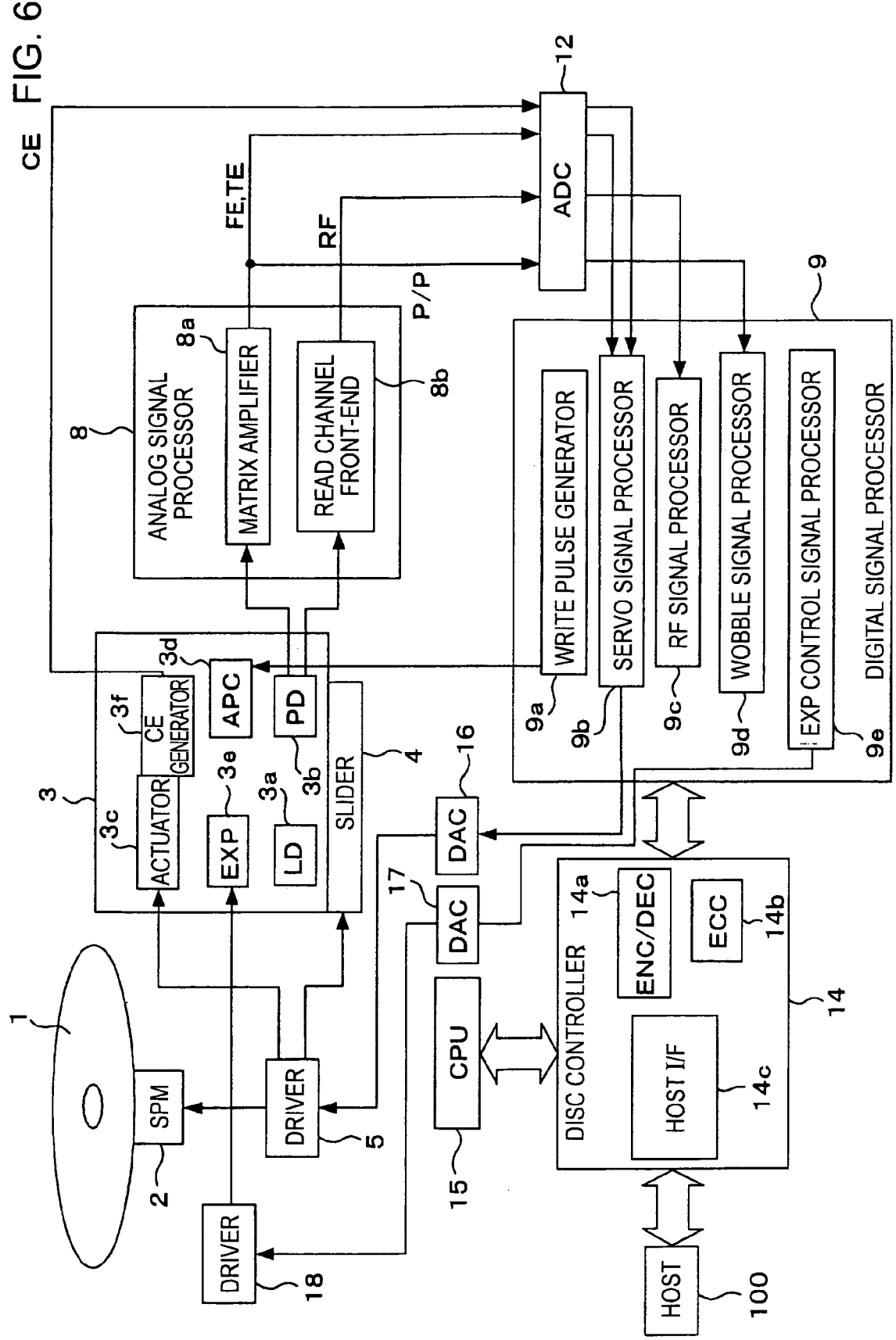
FIG. 6 is a block diagram showing a second configuration example of the disc drive apparatus according to the embodiment.

Since the center-point servo is turned on when the focus servo is on, this layer jump process can be performed with the first configuration example shown in FIG. 1 or with the second configuration example shown in FIG. 6.

A second example of the layer jump process performed by the servo controller 51 is described next with reference to FIG. 11.

Figure 11:
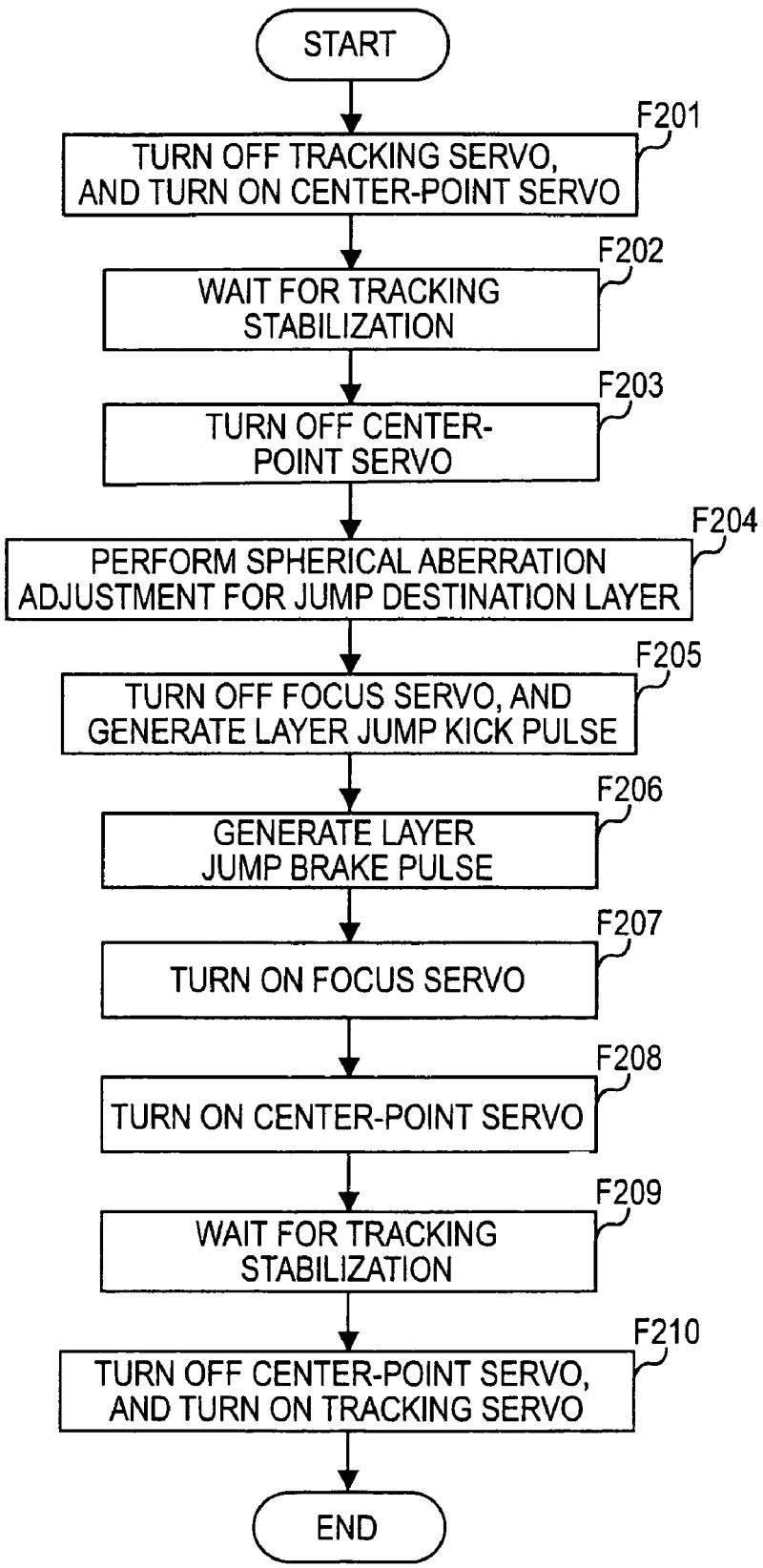
FIG. 11 is a flowchart showing a second example of the layer jump process according to the embodiment.

For starting layer jump, the servo controller 51 turns off the tracking servo and turns on the center-point servo in step F201 in FIG. 11. In other words, the servo controller 51 switches the switch unit 60 shown in FIG. 2 from the terminal TTS to the terminal TCS. Thus, immediately after the tracking servo is turned off, the biaxial actuator 3c operates such that the objective lens 84 is set to the center point position under the control of the center-point servo.

After the center-point servo is turned on, the servo controller 51 waits for stabilization of oscillation of the objective lens 84 in the tracking direction in step F202.

The servo controller 51 waits for tracking stabilization while monitoring a center-point error signal CE in step S202. In other words, as described above with reference to FIG. 13B, the servo controller 51 waits until the center-point error signal CE is within the level range between the thresholds th1 and th2. If it is determined that stabilization is achieved, the center-point servo is turned off in step F203. In other words, the servo controller 51 switches the switch unit 60 to the terminal TTOFF.

In step F204, the servo controller 51 issues an instruction for spherical aberration adjustment for a jump destination layer. In response to the instruction, the expander control signal processor 9e outputs a control signal for the expander lens mechanism 3e, and causes the expander lens mechanism 3e to perform spherical aberration adjustment. As described above with reference to FIG. 4, spherical aberration adjustment may be performed as control for the liquid crystal panel 3g.

In step F205, the servo controller 51 turns off the focus servo, and starts layer jump movement. In other words, the servo controller 51 switches the switch unit 59 from the terminal TFS to the terminal TLJ, and causes the layer jump signal generator 54 to output a kick pulse. Accordingly, the biaxial actuator 3c starts jump movement.

During the jump movement, the servo controller 51 monitors the waveform of a focus error signal FE, and at predetermined timing, the servo controller 51 causes the layer jump signal generator 54 to output a brake pulse in step F206. Thus, the speed of jump movement by the biaxial actuator 3c is reduced. For example, at the point in time when zero crossing of the S-shaped waveform of the focus error signal FE is detected, in step F207, the servo controller 51 switches the switch unit 59 from the terminal TLJ to the terminal TFS, and turns on the focus servo. Thus, the focus servo pull-in operation is performed.

After the focus servo pull-in operation is performed, the center-point servo is turned on in step F208. In other words, the servo controller 51 switches the switch unit 60 from the terminal TTOFF to the terminal TCS. Thus, the biaxial actuator 3c performs the center-point servo operation.

In step F209, the servo controller 51 monitors a center-point error signal CE, and waits for tracking stabilization. Then, it is determined that tracking stabilization is achieved when the center-point error signal CE is within the level range between the thresholds th1 and th2, and the servo controller 51 turns off the center-point servo and turns on the tracking servo in step F210. In other words, the servo controller 51 switches the switch unit 60 from the terminal TCS to the terminal TTS. Thus, the tracking servo pull-in operation is performed, and a state in which recording/playback to/from the jump destination layer can be performed is achieved. Accordingly, a series of layer jump operations is completed.

In the second example of the layer jump process, the center-point servo is turned on in the processing of step F208 after jump movement as well as in the processing before jump movement.

Tuning on the center-point servo in the processing of step F201 before jump movement provides an advantage similar to that of the first example of the layer jump process.

In the second example of the layer jump process, turning on the center-point servo after jump movement suppresses oscillation in the tracking direction after jump. Thus, the time necessary for waiting for tracking stabilization in the processing of step F209 can be further reduced and the tracking servo pull-in operation in the processing of step F210 can be performed with little oscillation. Thus, the tracking servo pull-in operation can be performed more stably in a shorter time.

As described above, according to the second example of the layer jump process in which the center-point servo is turned on before and after jump movement, layer jump can be performed more stably in a shorter time.

Since the center-point servo is turned on when the focus servo is on, this layer jump process can be performed with the first configuration example shown in FIG. 1 or with the second configuration example shown in FIG. 6.

A third example of the layer jump process performed by the servo controller 51 is described next with reference to FIG. 12.

Figure 12:
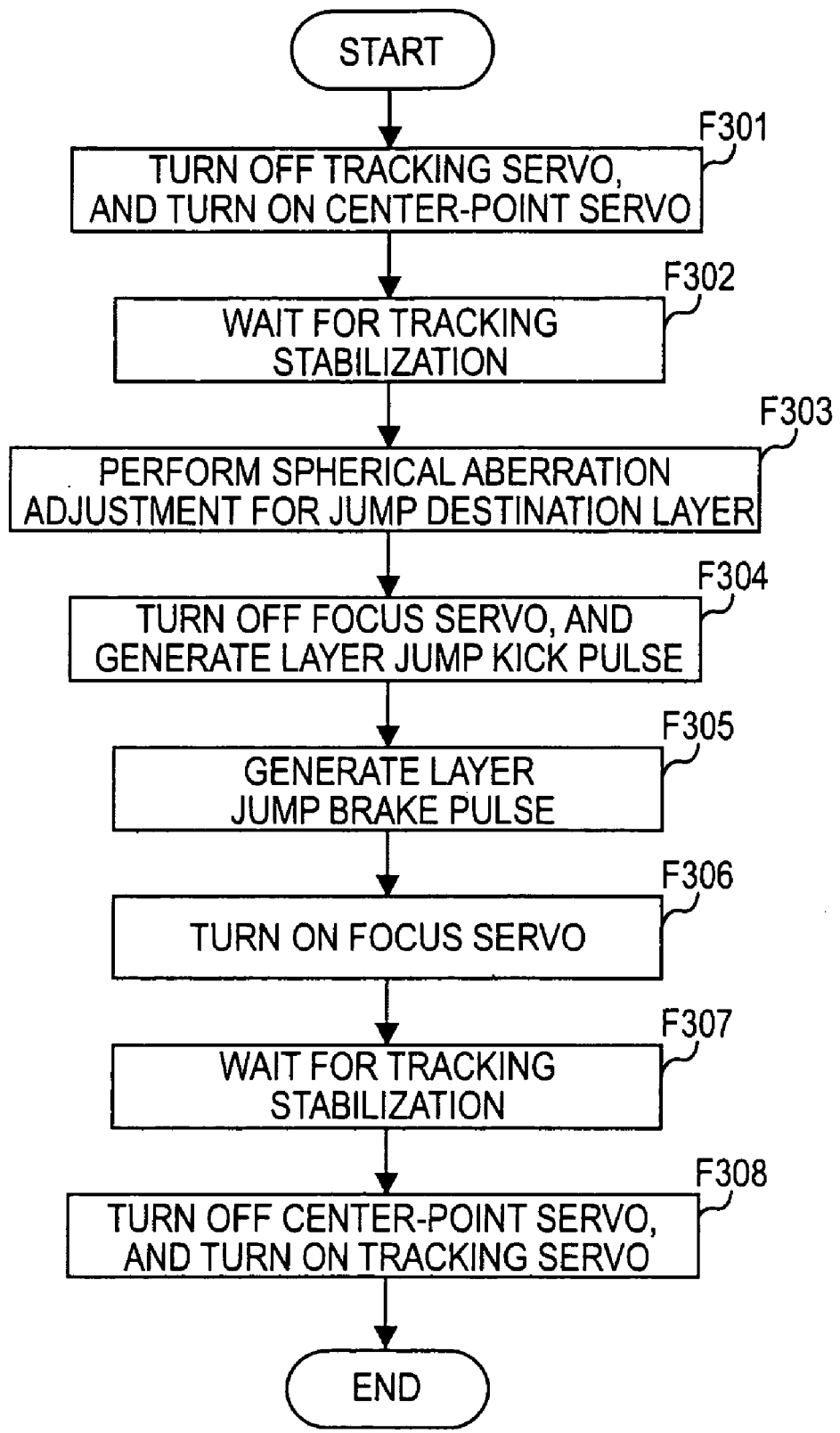
FIG. 12 is a flowchart showing a third example of the layer jump process according to the embodiment.

For starting layer jump, the servo controller 51 turns off the tracking servo and turns on the center-point servo in step F301 shown in FIG. 12. In other words, the servo controller 51 switches the switch unit 60 shown in FIG. 2 from the terminal TTS to the terminal TCS. Thus, immediately after the tracking servo is turned off, the biaxial actuator 3c operates such that the objective lens 84 is set to the center point position under the control of the center-point servo.

After the center-point servo is turned on, the servo controller 51 monitors a center-point error signal CE, and waits for stabilization of oscillation of the objective lens 84 in the tracking direction in step F302.

In step F303, the servo controller 51 issues an instruction for spherical aberration adjustment for a jump destination layer. In response to the instruction, the expander control signal processor 9e outputs a control signal for the expander lens mechanism 3e, and causes the expander lens mechanism 3e to perform spherical aberration adjustment. As described above with reference to FIG. 4, spherical aberration adjustment may be performed as control for the liquid crystal panel 3g.

In step F304, the servo controller 51 turns off the focus servo, and starts layer jump movement. In other words, the servo controller 51 switches the switch unit 59 from the terminal TFS to the terminal TLJ, and causes the layer jump signal generator 54 to output a kick pulse. Accordingly, the biaxial actuator 3c starts jump movement.

During the jump movement, the servo controller 51 monitors the waveform of a focus error signal FE, and at predetermined timing, the servo controller 51 causes the layer jump signal generator 54 to output a brake pulse in step F305. Thus, the speed of jump movement by the biaxial actuator 3c is reduced. For example, at the point in time when zero crossing of the S-shaped waveform of the focus error signal FE is detected, in step F306, the servo controller 51 switches the switch unit 59 from the terminal TLJ to the terminal TFS, and turns on the focus servo. Thus, the focus servo pull-in operation is performed.

After the focus servo pull-in operation is performed, the servo controller 51 monitors a center-point error signal CE, and waits for tracking stabilization in step F307. If it is determined that tracking stabilization is achieved, the servo controller 51 turns off the center-point servo and turns on the tracking servo in step F308. In other words, the servo controller 51 switches the switch unit 60 from the terminal TCS to the terminal TTS. Thus, the tracking servo pull-in operation is performed, and a state in which recording/playback to/from the jump destination layer can be performed is achieved. Accordingly, a series of layer jump operations is completed.

In the third example of the layer jump process, the center-point servo continues to be in the on-state during the period from turning on of the center-point servo in the processing of step F301 before jump movement to turning off of the center-point servo in the processing of step F308 after jump movement. In other words, the center-point servo continues to be in the on-state in the period before, during, and after jump movement.

Turning on the center-point servo before jump movement provides an advantage similar to that of the first example of the layer jump process. Turning on the center-point servo after jump movement provides an advantage similar to that of the second example of the layer jump process.

In addition, turning on the center-point servo during jump movement in the third example of the layer jump process suppresses oscillation in the tracking direction during jump. Thus, oscillation in the tracking direction that influences movement in the focus direction as cross action during jump can be suppressed, and jump movement can be stabilized. Furthermore, since oscillation in the tracking direction continues to be suppressed by a continuous center-point servo operation, the time necessary for waiting for tracking stabilization in the processing of step F307 is further reduced, and little time is required as waiting time.

As described above, according to the third example of the layer jump process in which the center-point servo continues to be in the on-state in the period before, during, and after jump movement, layer jump can be performed much more stably in a much shorter time.

Since the center-point servo is executed during jump movement when the focus servo is off, the layer jump process can be performed with the second configuration example shown in FIG. 6.

According to the foregoing embodiment, stability and rapidity of layer jump can be achieved. In other words, since the center-point servo is turned on and oscillation of the objective lens in the tracking direction is stabilized under the control of the center-point servo during a certain period when a series of operations as layer jump is performed, the stability of the series of layer jump operations can be achieved and the time required for the series of layer jump operations can be reduced.

In particular, turning on the center-point servo before jump movement rapidly suppresses oscillation in the tracking direction due to layer eccentricity and disturbance before jump, thus reducing a waiting time until start of jump movement. In addition, since the oscillation in the tracking direction is suppressed before jump, an operation during jump movement can be stabilized. Furthermore, since the oscillation in the tracking direction after jump is also reduced, a reduction in the waiting time for tracking stabilization and the stability and rapidity in the tracking servo pull-in operation can be achieved.

Turning on the center-point servo after jump movement rapidly suppresses oscillation in the tracking direction after jump. Thus, the tracking servo pull-in operation can be stabilized, and a time until start of the pull-in operation and a time required for the pull-in operation can be reduced.

Turning on the center-point servo during jump movement suppresses oscillation in the tracking direction during jump movement, suppresses the influence on the focus direction caused by cross action, and stabilizes the jump movement operation. In addition, when the tracking servo pull-in operation is performed after jump, an influence of the oscillation in the tracking direction before jump is not exerted, and a reduction in the waiting time for tracking stabilization and the stability and rapidity in the tracking servo pull-in operation can be achieved.

An example in which the center-point servo is turned on before jump movement, an example in which the center-point servo is turned on before and after jump movement, and an example in which the center-point servo continues to be in the on-state in the period before, during, and after jump movement have been described as the first example, the second example, and the third example of the layer jump process. However, other processing examples can be considered.

In other words, an example in which the center-point servo is in the on-state only during jump movement can be considered.

In addition, an example in which the center-point servo is in the on-state only after jump movement can be considered.

In addition, an example in which the center-point servo is in the on-state in the period during and after jump movement can be considered.

In addition, an example in which the center-point servo is in the on-state in the period before and during jump movement can be considered.

In addition, although spherical aberration adjustment is performed in each of the processing examples, the spherical aberration adjustment may be performed during the waiting time for tracking stabilization or during jump movement.

In addition, a system may not need spherical aberration adjustment.

In addition, although the configuration and operation of a disc drive apparatus (recording/playback apparatus) corresponding to a playback apparatus are described in the foregoing embodiment, the present invention is also applicable to a playback-only apparatus or a recording-only apparatus.

Obviously, the present invention is also applicable to layer jump processing between layers of a multilayer disc having three or more layers.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus that plays back a recording medium having a plurality of recording layers, comprising:
   an optical head that irradiates the plurality of recording layers with laser light using an objective lens as an output terminal, that detects reflection information on the laser light, and that reads information recorded in the plurality of recording layers;
   an actuator that holds the objective lens such that the objective lens is capable of moving in a focus direction and a tracking direction;
   focus servo means for driving the actuator in accordance with a focus error signal acquired from the reflection information read by the optical head to execute focus servo;
   layer movement driving means for generating a layer jump driving signal used for moving a position of the objective lens from an in-focus position for a recording layer to an in-focus position for another recording layer to drive the actuator to perform movement of the objective lens in an interlayer direction;
   tracking servo means for driving the actuator in accordance with a tracking error signal acquired from the reflection information read by the optical head to execute tracking servo;
   center-point servo means for driving the actuator in accordance with a center-point error signal functioning as an error signal for a center point position of the objective lens in the tracking direction to execute center-point servo for setting the objective lens to the center point position; and
   layer jump sequence control means for performing a series of layer jump operations of causing the tracking servo means to turn off the tracking servo, causing the focus servo means to turn off the focus servo to cause the layer movement driving means to perform the movement of the objective lens in the interlayer direction, causing the focus servo means to turn on the focus servo, and causing the tracking servo means to turn on the tracking servo and for causing the center-point servo means to execute the center-point servo in a predetermined time within a period during which the series of layer jump operations is performed.

2. The playback apparatus according to claim 1, wherein the layer jump sequence control means causes the center-point servo means to execute the center-point servo in a predetermined time before the layer movement driving means starts the movement in the interlayer direction within the period during which the series of layer jump operations is performed.

3. The playback apparatus according to claim 1, wherein the layer jump sequence control means causes the center-point servo means to execute the center-point servo in a predetermined time after the layer movement driving means completes the movement in the interlayer direction within the period during which the series of layer jump operations is performed.

4. The playback apparatus according to claim 1, wherein the layer jump sequence control means causes the center-point servo means to execute the center-point servo during the movement in the interlayer direction performed by the layer movement driving means within the period during which the series of layer jump operations is performed.

5. A layer jump method in a playback apparatus that irradiates a recording medium having a plurality of recording layers with laser light using an objective lens as an output terminal, that detects reflection information on the laser light, and that reads information recorded in the plurality of recording layers for moving the objective lens from a state in which information is capable of being read from a recording layer to a state in which information is capable of being read from another recording layer, the method comprising the steps of:
   turning off tracking servo;
   turning off focus servo to perform movement of the objective lens in an interlayer direction;
   turning on the focus servo;
   turning on the tracking servo; and
   executing center-point servo for setting the objective lens to a center point position in a tracking direction in a predetermined time within a period during which layer jump operations from the step of turning off the tracking servo to the step of turning on the tracking servo are performed.

6. The layer jump method according to claim 5, wherein the step of executing the center-point servo is performed within a period from the step of turning off the tracking servo to the step of turning off the focus servo to perform the movement of the objective lens in the interlayer direction.

7. The layer jump method according to claim 5, wherein the step of executing the center-point servo is performed within a period from the step of turning on the focus servo to the step of turning on the tracking servo.

8. The layer jump method according to claim 5, wherein the step of executing the center-point servo is performed within a period during which the movement in the interlayer direction is performed.

9. A playback apparatus that plays back a recording medium having a plurality of recording layers, comprising:

an optical head that irradiates the plurality of recording layers with laser light using an objective lens as an output terminal, that detects reflection information on the laser light, and that reads information recorded in the plurality of recording layers;

an actuator that holds the objective lens such that the objective lens is capable of moving in a focus direction and a tracking direction;

a focus servo section that drives the actuator in accordance with a focus error signal acquired from the reflection information read by the optical head to execute focus servo;

a layer movement driving section that generates a layer jump driving signal used for moving a position of the objective lens from an in-focus position for a recording layer to an in-focus position for another recording layer to drive the actuator to perform movement of the objective lens in an interlayer direction;

a tracking servo section that drives the actuator in accordance with a tracking error signal acquired from the reflection information read by the optical head to execute tracking servo;

a center-point servo section that drives the actuator in accordance with a center-point error signal functioning as an error signal for a center point position of the objective lens in the tracking direction to execute center-point servo for setting the objective lens to the center point position; and a layer jump sequence controller that performs a series of layer jump operations of causing the tracking servo section to turn off the tracking servo, causing the focus servo section to turn off the focus servo to cause the layer movement driving section to perform the movement of the objective lens in the interlayer direction, causing the focus servo section to turn on the focus servo, and causing the tracking servo section to turn on the tracking servo and that causes the center-point servo section to execute the center-point servo in a predetermined time within a period during which the series of layer jump operations is performed.

* * * * *